Patented Jan. 24, 1950

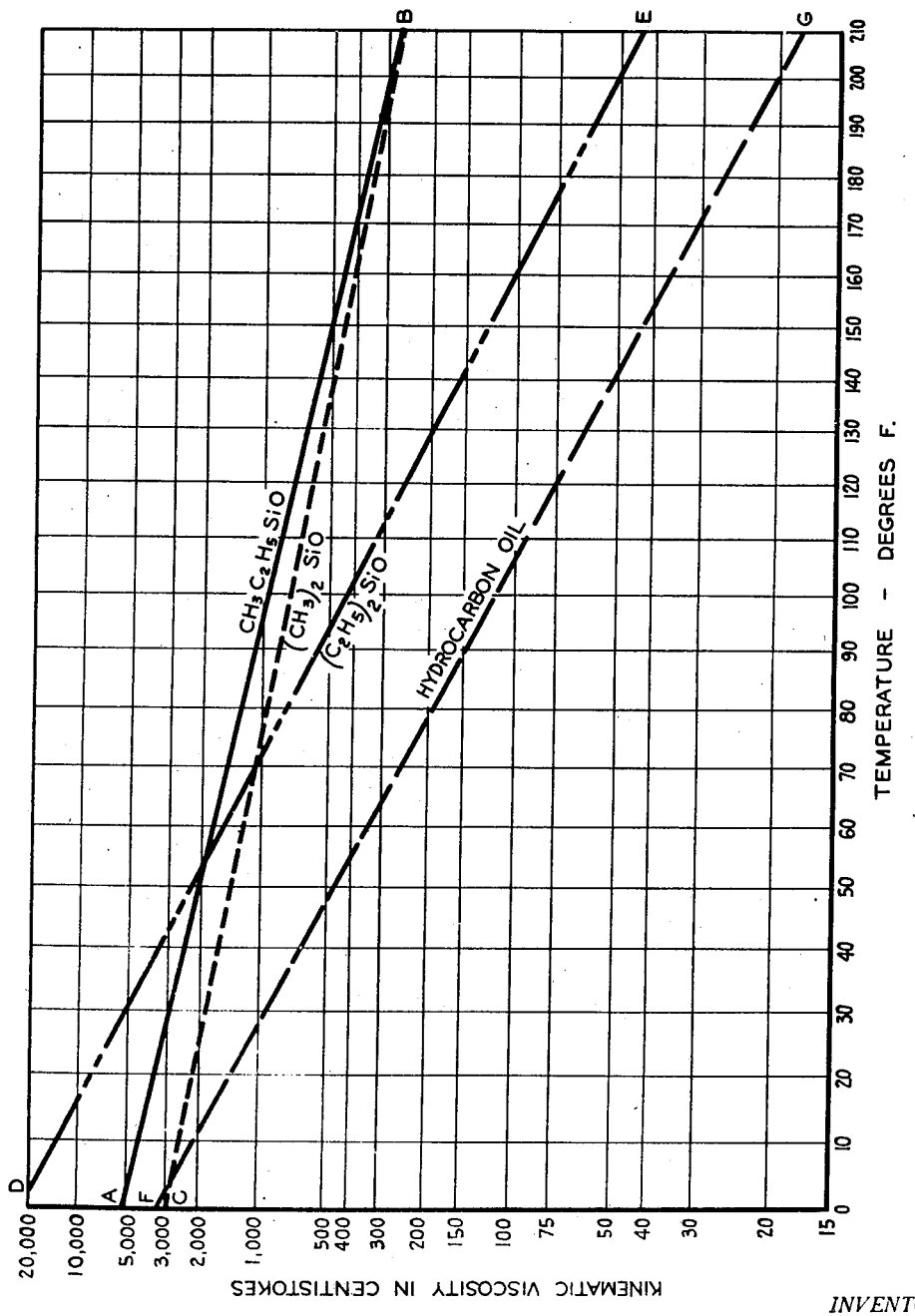

2,495,363

UNITED STATES PATENT OFFICE 2,495,363

ETHYLMETHYLPOLYSILOXANES

Arthur J. Barry and John W. Gilkey, Midland, Mich., assignors to Dow Corning Corporation, Midland, Mich., a corporation of Michigan Application July 31, 1948, Serial No. 41,824

4 Claims. (Cl. 260—448.2)

1

This invention relates to new compositions of matter and more particularly to ethylmethylpolysiloxanes.

As is well known in the art, fluid dimethylpolysiloxanes because of their chemical inertness and good temperature viscosity behavior, are particularly useful for lubricants and damping media. In spite of the excellent properties of the dimethylsiloxane fluids their utility is limited by the fact that they have freezing points at about or above −65° C. Thus, the fluid dimethyl siloxanes are unsuited for use in the extremes of temperature encountered in the Arctic.

It is an object of this invention to prepare siloxanes which, while retaining the desirable properties of dimethylpolysiloxanes, will, at the same time, possess freezing points sufficiently low that they may be used in the extremes of Arctic temperatures.

This invention deals with compounds of the type $(CH_3C_2H_5SiO)_n$ where $n$ is an integer of at least three. Compounds of this type may be in the form of distillable low polymeric cyclics containing from 3 to 6 silicon atoms or in the form of non-distillable high polymeric materials. The viscosities of the non-distillable ethylmethylsiloxanes range from that of a light oil of less than 100 cs. viscosity to materials which show little or no flow at room temperature.

The siloxanes of this invention are prepared by the hydrolysis of compounds of the type $CH_3C_2H_5SiX_2$ where X is a hydrolyzable group such as halogen or alkoxy. These silanes may be prepared by any appropriate method. For example, they may be synthesized by the well-known Grignard reaction. Alternatively, the preparation may be carried out by heating a methyldihalosilane such as $CH_3HSiCl_2$ with ethylene under pressure to form $C_2H_5CH_3SiCl_2$. This process is more fully set forth in the copending application of Arthur J. Barry et al., Serial Number 674,926, filed June 6, 1946, assigned to the Dow Chemical Company.

The above ethylmethylsilanes are reacted with water, whereby hydrolysis and condensation takes place to give the ethylmethylpolysiloxanes of this invention. The hydrolysis may be carried out either with or without a solvent and in the presence or absence of condensation catalysts. The temperature employed is not critical but the preferred range is from 0° to 250° C. By controlling the hydrolysis conditions such as temperature, time of heating and type of catalyst employed siloxanes of any desired viscosity may be obtained. As is well known in the art, the employ-

2 ment of a condensation catalyst, high temperatures and long heating time favors the formation of higher polymers.

Cyclic ethylmethylsiloxanes are formed by intra molecular condensation during the hydrolysis of the ethylmethylsilanes. The cyclic materials may be separated by distillation from the non-volatile polymers. The cyclic distillable ethylmethylsiloxanes of this invention may also be prepared by cracking of high polymeric ethylmethylpolysiloxanes. This may be done by heating the high polymer preferably in the presence of an alkali metal hydroxide, at a temperature above 250° C. Such a treatment results in the depolymerization of the high polymer to produce volatile cyclics. If this process is employed it should be carried out in the substantial absence of oxygen to prevent the removal of organic groups from the silicon atoms.

The low molecular weight cyclic polymers may be further polymerized to give non-volatile products. The polymerization is carried out by contacting the ethylmethyl cyclics with a polymerization catalyst such as a strong acid or an alkali metal hydroxide. It is preferred that temperatures be in the range between 50 to 250° C. Best results are obtained if the amount of catalyst employed is between 1 to 10 parts by weight of catalyst per 100 parts of siloxane. If desired a solvent may be employed to aid in the solution of the catalyst.

The high polymers, obtained either as the residue after removal of distillable cyclic polymers or those obtained by polymerization of the cyclics, may range in viscosity from below 100 cs. to materials which exhibit little or no flow at room temperature.

Ethylmethylsiloxanes of this invention are particularly adaptable for use as damping media and lubricants at low temperatures. They possess the combination of low freezing points and relatively small change in viscosity with temperature not found in other known siloxanes. As a comparison of the behavior of ethylmethylsiloxane with dimethylsiloxane and diethylsiloxane, recourse should be had to the accompanying drawing, in which are shown the viscosity-temperature slopes of the three siloxanes and a hydrocarbon oil. It is quite obvious that the ethylmethylsiloxane has greatly superior temperature viscosity behavior to that of diethylsiloxane and hydrocarbon oils.

The drawing is a graph of kinematic viscosity in centistokes against the temperature in degrees F. on an ASTM Standard Viscosity-Temperature chart. In the drawing, temperature-viscosity slopes of the various materials are represented as follows: ethylmethylpolysiloxane by the line AB, dimethylpolysiloxane by the line CB, diethylpolysiloxane by the line DE, and a hydrocarbon oil by the line FG.

The substantially lower freezing point of the ethylmethyl siloxanes over dimethylsiloxanes is clearly shown in Table I, by a comparison of the melting points of the cyclic trimers.

Table I

|        | $[(CH_3)_2SiO]_3$ | $[CH_3C_2H_5SiO]_3$ | $[(C_2H_5)_2SiO]_3$ |
|--------|-------------------|---------------------|---------------------|
| M. P...| +65° C.           | −2.7° C.            | +9.9° C.            |

It can also be seen that the freezing point of the 1,3,5 triethyltrimethylcyclotrisiloxane is below that of the hexaethylcyclotrisiloxane. This is an anomalous result. It should be expected that 1,3,5 triethyltrimethylcyclotrisiloxane would melt at some temperature between that of hexaethylcyclotrisiloxane and hexamethylcyclotrisiloxane. Thus, the low melting point of the ethylmethylsiloxanes is an unexpected advantage.

Other uses of ethylmethylsiloxanes are as follows:

A minor proportion of the cyclic ethylmethylsiloxane when incorporated in a hydrocarbon oil serves to increase the viscosity of the oil to a marked extent, as well as inhibit its tendency to foam. It has been found that synthetic elastomers which remain flexible at extremely low temperatures may be prepared by combining the high viscosity ethylmethylsiloxane polymers with suitable fillers, such as metallic oxides, carbonates, asbestos, glass flocks, etc., and vulcanizing agents such as benzoyl peroxide and tertiary butyl perbenzoate and heating the mixture at a temperature of at least 100° C. for at least 3 minutes. The elastomers so formed remained flexible at temperatures down to −100° C. and lower whereas elastomers prepared from dimethyl siloxanes became brittle at temperatures in the neighborhood of −65° C.

The polymeric ethylmethylsiloxanes may be copolymerized with other siloxanes to form products having desirable characteristics. These copolymers may be diluted with suitable oils or solvents to form coating compositions.

In order that those skilled in the art may better understand this invention, recourse should be had to the following examples which should be considered as illustrative only.

EXAMPLES

Example 1

2,400 cc. of $H_2O$ were combined with an equal volume of ether and 1,236 g. of $C_2H_5CH_3SiCl_2$ were added slowly thereto with stirring. During the addition, the temperature of the mixture was maintained below 20° C. by external cooling. Upon completion of the addition, an acid layer and a product layer were formed. The acid layer was separated, and the liquid product layer was washed until neutral. Residual water and ether were then distilled from this portion leaving 675.6 g. of mixed cyclic ethyl methyl siloxanes. The liquid siloxane mixture was then fractionated, whereby there was obtained 439.7 g. (65.1%) of $(C_2H_5CH_3SiO)_3$, 123 g. (18.2%) of $(C_2H_5CH_3SiO)_4$, 29 g. (4.39%) of $(C_2H_5CH_3SiO)_5$, 4 g. (.59%) of $(C_2H_5CH_3SiO)_6$, and 28.4 g. (4.22%) of residue. This residue, which had substantially no flow at room temperature, was composed of higher molecular weight ethyl methyl siloxanes.

Table II

| Compound | Boiling Point °C. at 760 mm. | Refractive Index N 20° C. | Freezing Point, °C. | S. G. at 20° C. |
|----------|------------------------------|---------------------------|---------------------|-----------------|
| $(C_2H_5CH_3SiO)_3$ | 198.9 | 1.4110 | −2.97 | .947 |
| $(C_2H_5CH_3SiO)_4$ | 244.7 | 1.4164 | −37 to −43 | .955 |
| $(C_2H_5CH_3SiO)_5$ | 287.7 | 1.4208 | −122 | .965 |
| $(C_2H_5CH_3SiO)_6$ | 326.0 | 1.4245 | −115 to −120 | .976 |

The structures of the above compounds were confirmed by infrared examinations and by the determination of vapor pressure and boiling point curves.

Example 2

618 g. of $C_2H_5CH_3SiCl_2$ were hydrolyzed and condensed following the procedure outlined in Example 1, except that the amount of ether used was one-half that employed in the previous example. On fractionating the mixture of cyclic ethyl methyl siloxanes obtained as product, there was isolated 55.4% of cyclic ethyl methyl siloxane trimer, 20.9% of tetramer, 4.45% of pentamer, 1.93% of hexamer, and 12.45% of residue. This residue had a viscosity of 3115 centistokes at 20° C.

Example 3

$C_2H_5CH_3SiCl_2$ was hydrolyzed by adding water thereto with agitation, the temperature being maintained below 20° C. Sufficient water was added to provide an excess over that theoretically required to hydrolyze the silane. Upon completion of the addition, the mixture was refluxed for two hours. An acid layer and a siloxane product layer formed, the former being separated from the liquid siloxane portion of the mixture. A volume of 5% NaOH equal to the volume of the siloxane portion was then added thereto and this mixture was refluxed for one hour. Thereafter the mixture was washed until neutral, dried and filtered. After removal of volatile materials by distillation, a mixed cyclic ethyl methyl siloxane fluid having a viscosity of 136.2 centistokes at 20° C. was obtained.

Example 4

0.2 g. of powdered NaOH was added to 132 g. of cyclic ethyl methyl trisiloxane having the formula $(C_2H_5CH_3SiO)_3$. This mixture was heated with agitation for 6 hours at 165° C. After standing for four days, the viscosity of the resulting high polymer siloxane fluid was approximately 10,000 centistokes at 20° C.

That which is claimed is:

1. $(C_2H_5CH_3SiO)_n$ where $n$ is an integer of at least 3.

2. A cyclic polysiloxane of the type $$(C_2H_5CH_3SiO)_n$$

where $n$ is an integer from 3 to 6.

3. A polymeric siloxane containing only $$\begin{array}{c} C_2H_5 \\ -SiO- \\ CH_3 \end{array}$$

groups.

4. A liquid polymeric siloxane having a viscosity of at least 100 cs. which siloxane contains only $$\begin{array}{c} C_2H_5 \\ -SiO- \\ CH_3 \end{array}$$

groups.

ARTHUR J. BARRY.
JOHN W. GILKEY.

No references cited.